(12) United States Patent
Kannari et al.

(10) Patent No.: US 6,773,656 B2
(45) Date of Patent: Aug. 10, 2004

(54) BLOW MOLDED PRODUCT AND PRODUCTION METHOD THEREFOR

(75) Inventors: Tadahiro Kannari, Ichihara (JP); Minoru Sugawara, Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 10/349,109

(22) Filed: Jan. 23, 2003

(65) Prior Publication Data

US 2003/0143351 A1 Jul. 31, 2003

Related U.S. Application Data

(62) Division of application No. 09/744,965, filed as application No. PCT/JP00/03725 on Jun. 8, 2000, now abandoned.

(30) Foreign Application Priority Data

Jun. 14, 1999 (JP) ............................................. 11-166211

(51) Int. Cl.⁷ .......................... B29C 49/22; B29C 49/64
(52) U.S. Cl. ........................ 264/515; 264/521; 264/904
(58) Field of Search ................................. 264/515, 521, 264/904

(56) References Cited

U.S. PATENT DOCUMENTS

| | | |
|---|---|---|
| 4,517,151 A | 5/1985 | Masumoto et al. |
| 4,871,796 A | 10/1989 | Komatsu et al. |
| 5,047,270 A | 9/1991 | Mori et al. ............... 264/209.1 |
| 5,518,791 A | 5/1996 | Shimoda et al. ........... 428/36.2 |
| 6,303,071 B1 | 10/2001 | Sugawara et al. |
| 6,344,166 B1 * | 2/2002 | Aoki et al. .................. 264/521 |
| 6,403,708 B2 | 6/2002 | Moriya et al. |
| 6,406,661 B1 * | 6/2002 | Schloss ....................... 264/521 |
| 6,423,263 B1 | 7/2002 | Koizumi et al. ............ 264/234 |

FOREIGN PATENT DOCUMENTS

| | | |
|---|---|---|
| EP | 623 448 | 11/1994 |
| JP | 358140225 A * | 8/1983 |
| JP | 10-278107 | 10/1998 |
| JP | 11-010718 | 1/1999 |

OTHER PUBLICATIONS

Patent Abstracts of Japan, JP 10–278107, Oct. 20, 1998.
Patent Abstracts of Japan, JP 58–140225, Aug. 19, 1883.
Patent Abstracts of Japan, JP 60–112419, and Derwent Abstracts, AN–1985–182125, XP–002236512, Jun. 18, 1985.
Patent Abstracts of Japan, JP 10–016042, Jan. 20, 1998.

* cited by examiner

*Primary Examiner*—Suzanne E. McDowell
(74) *Attorney, Agent, or Firm*—Oblon, Spivak, McClelland, Maier & Neustadt, P.C.

(57) ABSTRACT

Provided are scratch-resistant blow moldings of crystalline resin having good surface gloss of at least 80% and high surface hardness of at least HB. A crystalline resin melt parison is blown in a blow mold into a blow-molded article, where the temperature of the inner wall of the mold falls between 20° C. lower than the crystallization temperature of the crystalline resin and 5° C. lower than the melting point of the crystalline resin; then, a pressure fluid is introduced into the pinched parison; then the mold is heated to a temperature lower by 10° C. than the melting point of the crystalline resin and a temperature below the melting point of the crystalline resin.

8 Claims, No Drawings

BLOW MOLDED PRODUCT AND PRODUCTION METHOD THEREFOR

TECHNICAL FIELD

The present invention relates to blow moldings of crystalline resin and to a method for producing them. More precisely, the invention relates to scratch-resistant blow moldings of crystalline resin having good surface gloss and high surface hardness, and relates to an efficient method for producing them.

BACKGROUND OF THE INVENTION

Since blow moldings of crystalline thermoplastic resin are much more lightweight than injection moldings thereof, and have good mechanical strength, they have many applications in various industrial fields. In particular, since blow moldings of polyolefin-type crystalline resin such as those of crystalline polypropylene are recyclable and since the load of their wastes to the environment is low, they cover a broad range of practical applications. For example, they are much used for automobile parts such as spoilers and other aerodynamic parts, side moldings, bumpers, instrument panels; and for housing facilities such as bath units, toilets, walls, ceilings, etc. The appearance of these articles is much influenced by the surface characteristics of blow moldings for them. Therefore, for obtaining articles having better surface appearance, employed is a method of overcoating the blow moldings produced for them to thereby improve the surface appearance of the thus-coated articles. However, moldings to be overcoated require surface treatment of sanding them, or require pre-treatment of primer coating or plasma processing for improving the adhesiveness of coating compositions thereto, and, in addition, the coating films must be dried. Therefore, the method of overcoating moldings is problematic in that such pre-treatment and post-treatment take much labor and a lot of time and therefore the productivity of the coated articles is low.

In that situation, some blow-molding techniques for obtaining blow moldings having good surface gloss and good appearance even though not post-treated for overcoating them have been developed. For example, in Japanese Patent Publication No. 40498/1990, proposed is a method for producing blow moldings having good surface gloss. The method comprises preparing a resin parison of such that its surface has a large number of fine recesses having a depth of from 2 to 100 microns, in the space of a mirror-finished blow mold heated up to a temperature not lower than the crystallization temperature of the resin, then blow-molding the parison therein, and thereafter cooling the mold to a temperature lower than the crystallization temperature of the resin. However, the method is still problematic in that it requires specific control in the step of parison formation and requires a prolonged molding cycle for producing large-size moldings, and therefore the productivity of the moldings is low.

Another method is proposed in Japanese Patent Laid-Open No. 77231/1992, which comprises preparing a crystalline resin parison in the space of a blow mold, clamping the mold, and injecting a pressure fluid into the parison so that the parison is blown and cooled while being tightly pressed against the inner wall of the mold, and is thereby formed into a blow-molded article. In the method, the blow mold used is so controlled that its temperature may fall between a temperature around which the crystallization rate of the crystalline resin is the highest and the melting point of the resin while the coolant fluid is injected into the resin parison prepared therein, and the coolant is circulated under pressure in the parison. In the method, the die line and the weld line in the surface of the blow moldings produced could be reduced in some degree probably to a negligible level. However, the method is still problematic in that the transferability of the mold cavity design onto the moldings produced and also the surface gloss of the moldings are not on a satisfactory level.

Still another method is proposed in Japanese Patent Laid-Open No. 138324/1998, which comprises preparing an extruded parison of polypropylene in a blow mold, clamping the mold with the parison therein being pre-blown, and finally blowing the parison in the mold. In the method, the mold is temporarily heated at a temperature not lower than 140° C. after it has been clamped and before it is opened to take the blow-molded article out of it. The method is superior to the case where the mold temperature is kept lower than 140° C. all the time for blow molding, as the blow moldings produced have improved surface gloss. However, the method is still problematic in that the surface hardness of the blow moldings produced is not so high and the blow moldings are often scratched.

The present invention is to provide scratch-resistant blow moldings of crystalline resin having good surface gloss and high surface hardness, and to provide a method for producing them.

DISCLOSURE OF THE INVENTION

To attain the object as above, we, the present inventors have assiduously studied and investigated the molding conditions for blow moldings of crystalline resin, and, as a result, have found that, when the temperature control of the inner surface of the blow mold used is suitably combined with the retention time of the parison in the mold within a specific temperature range, then the blow molding from the parison has good characteristics intrinsic to crystalline resin. On the basis of this finding, we have completed the present invention.

Specifically, the invention is summarized as follows:

(1) A blow molding of crystalline resin, of which the surface gloss is at least 80% measured at an incident angle of 60° according to JIS K7105, and of which the surface scratch resistance in terms of the pencil hardness measured in a pencil scratch test according to JIS K5400 is at least on the level of HB.

(2) The blow molding of above (1), which has a multi-layered structure of at least two layers, and of which the outermost layer is a crystalline resin layer.

(3) A method for producing blow moldings, which comprises preparing a crystalline resin melt parison in the space of a blow mold, clamping the mold, and introducing a pressure fluid into the parison to blow and tightly press the parison against the inner wall of the mold, thereby solidifying the parison along the wall; the method being characterized in that the temperature of the inner wall of the mold is so controlled that it falls between a temperature lower by 20° C. than the crystallization temperature of the crystalline resin and a temperature below the temperature lower by 5° C. than the melting point of the crystalline resin, while the parison is prepared in the mold, and that, after the mold has been clamped to pinch the parison therein, a pressure fluid is introduced into the thus-pinched parison, then the mold with the parison therein is so heated that the temperature of its inner wall falls between a temperature lower by 10° C. than the melting point of the crystalline resin and a temperature below the melting point of the crystalline resin, the parison is kept in the mold at the controlled temperature falling between a temperature lower by 10° C. than the melting point of the crystalline resin and a temperature below the melting point of the crystalline resin for a satisfactory period of time enough for the thus blow-molded article of the parison to have a surface hardness of not lower than the level of HB in terms of the pencil hardness measured in a pencil scratch test, and finally the mold is cooled and the blow-molded article is released from the mold.

(4) A method for producing blow moldings, which comprises preparing a crystalline resin melt parison in the space of a blow mold, clamping the mold, and introducing a pressure fluid into the parison to blow and tightly press the parison against the inner wall of the mold, thereby solidifying the parison along the wall; the method being characterized in that the temperature of the inner wall of the mold is so controlled that it is lower by from 5 to 10° C. than the crystallization temperature of the crystalline resin, while the parison is prepared in the mold, and that, after the mold has been clamped to pinch the parison therein, a pressure fluid is introduced into the thus-pinched parison, then the mold with the parison therein is so heated that the temperature of its inner wall falls between a temperature lower by 10° C. than the melting point of the crystalline resin and a temperature below the melting point of the crystalline resin, the parison is kept in the mold at the controlled temperature falling between a temperature lower by 10° C. than the melting point of the crystalline resin and a temperature below the melting point of the crystalline resin for a satisfactory period of time enough for the thus blow-molded article of the parison to have a surface hardness of not lower than the level of HB in terms of the pencil hardness measured in a pencil scratch test, and finally the mold is cooled and the blow-molded article is released from the mold.

(5) The method for producing blow moldings of above (3) or (4), in which the mold is clamped to pinch the parison therein, a pressure fluid is introduced into the thus-pinched parison, then the mold with the parison therein is so heated that the temperature of its inner wall is lower by from 5 to 10° C. than the melting point of the crystalline resin that forms the parison, and the parison is kept in the mold at the controlled temperature lower by from 5 to 10° C. than the melting point of the crystalline resin for a satisfactory period of time enough for the thus blow-molded article to have a surface hardness of not lower than the level of HB in terms of the pencil hardness measured in a pencil scratch test.

(6) A method for producing multi-layered blow moldings of at least two layers with an outermost layer of crystalline resin, which comprises preparing a melt parison in the space of a blow mold, clamping the mold, and introducing a pressure fluid into the parison to blow and tightly press the parison against the inner wall of the mold, thereby solidifying the parison along the wall; the method being characterized in that the temperature of the inner wall of the mold is so controlled that it falls between a temperature lower by 20° C. than the crystallization temperature of the crystalline resin and a temperature below the temperature lower by 5° C. than the melting point of the crystalline resin, while the parison is prepared in the mold, and that, after the mold has been clamped to pinch the parison therein, a pressure fluid is introduced into the thus-pinched parison, then the mold with the parison therein is so heated that the temperature of its inner wall falls between a temperature lower by 10° C. than the melting point of the crystalline resin and a temperature below the melting point of the crystalline resin, the parison is kept in the mold at the controlled temperature falling between a temperature lower by 10° C. than the melting point of the crystalline resin and a temperature below the melting point of the crystalline resin for a satisfactory period of time enough for the thus blow-molded article of the parison to have a surface hardness of not lower than the level of HB in terms of the pencil hardness measured in a pencil scratch test, and finally the mold is cooled and the blow-molded article is released from the mold.

(7) A method for producing multi-layered blow moldings of at least two layers with an outermost layer of crystalline resin, which comprises preparing a melt parison in the space of a blow mold, clamping the mold, and introducing a pressure fluid into the parison to blow and tightly press the parison against the inner wall of the mold, thereby solidifying the parison along the wall; the method being characterized in that the temperature of the inner wall of the mold is so controlled that it is lower by from 5 to 10° C. than the crystallization temperature of the crystalline resin, while the parison is prepared in the mold, and that, after the mold has been clamped to pinch the parison therein, a pressure fluid is introduced into the thus-pinched parison, then the mold with the parison therein is so heated that the temperature of its inner wall falls between a temperature lower by 10° C. than the melting point of the crystalline resin and a temperature below the melting point of the crystalline resin, the parison is kept in the mold at the controlled temperature falling between a temperature lower by 10° C. than the melting point of the crystalline resin and a temperature below the melting point of the crystalline resin for a satisfactory period of time enough for the thus blow-molded article of the parison to have a surface hardness of not lower than the level of HB in terms of the pencil hardness measured in a pencil scratch test, and finally the mold is cooled and the blow-molded article is released from the mold.

(8) The method for producing blow moldings of above (6) or (7), in which the mold is clamped to pinch the parison therein, a pressure fluid is introduced into the thus-pinched parison, then the mold with the parison therein is so heated that the temperature of its inner wall is lower by from 5 to 10° C. than the melting point of the crystalline resin that forms the outermost layer of the parison, and the parison is kept in the mold at the controlled temperature lower by from 5 to 10° C. than the melting point of the crystalline resin for a satisfactory period of time enough for the thus blow-molded article to have a surface hardness of not lower than the level of HB in terms of the pencil hardness measured in a pencil scratch test.

(9) The method for producing blow moldings of any of above (3) to (8), wherein the period of time enough for the blow-molded article to have a surface hardness of not lower than the level of HB in terms of the pencil hardness measured in a pencil scratch test is at least 10 seconds.

(10) The method for producing blow moldings of above (9), wherein the period of time enough for the blow-molded article to have a surface hardness of not lower than the level of HB in terms of the pencil hardness measured in a pencil scratch test is at least 20 seconds.

BEST MODES FOR CARRYING OUT THE INVENTION

The blow molding of the invention is so constituted that at least its outermost layer is of crystalline resin, that its surface gloss is at least 80% measured at an incident angle of 60° according to JIS K7105, and that its surface scratch resistance in terms of the pencil hardness measured in a pencil scratch test according to JIS K5400 is at least on the level of HB.

The crystalline resin for the blow molding of the invention may be crystalline thermoplastic resin, and its preferred examples are homopolymers of $\alpha$-olefins such as ethylene, propylene and butene-1, copolymers of such $\alpha$-olefins, polyamide resins, polyester resins, etc. Of those crystalline resins, especially preferred are polypropylene-type polymers such as homopolypropylene and propylene-block copolymers comprising a homopolypropylene component and an ethylene-propylene copolymer component. Preferably, the polypropylene-type polymers for use in the invention have a melt index, measured at a temperature of 230° C. under a load of 2.16 kg according to ASTM D1238, of from 0.01 to 10 g/10 min, more preferably from 0.05 to 3 g/10 min.

Regarding its layer structure, the blow molding of the invention may have a single-layered structure or a multi-layered structure that comprises a base layer and a surface layer. Of the multi-layered blow molding, for example, the base layer may have a single-layered structure or a multi-layered, two-layered or three-layered structure of thermoplastic resin having good impact resistance, such as propylene-block copolymers, high-density polyethylene, low-density polyethylene, polyamides, etc.; and the surface layer thereof is preferably a homopolypropylene layer having a melt index of from 0.01 to 40 g/10 min.

The base layer may contain an inorganic filler to improve the rigidity, mechanical strength and heat resistance of the blow molding. The amount of the inorganic filler that may be in the base layer may be the same as that in ordinary resin moldings, and the inorganic filler content of the layer is preferably at most 50% by weight. The inorganic filler includes, for example, mica, talc, calcium carbonate, kaolin, barium sulfate, various types of metal powders, glass beads, glass fibers, etc.

The wall thickness of the blow molding of the invention can vary, depending on the external dimension thereof and on the necessary characteristics thereof such as mechanical strength and heat resistance. In general, it is desirable that the wall thickness of the blow molding having a single-layered structure falls between 1 and 5 mm or so. In the blow molding having a multi-layered structure, it is desirable that the wall thickness of the base layer falls between 1 and 5 mm or so and that the wall thickness of the surface layer falls between 100 $\mu$m and 1 mm or so.

The material to form the outermost layer of the blow molding of the invention (that is, the starting resin to form the blow molding itself having a single-layered structure, or the starting resin to form the surface layer of the blow molding having a multi-layered structure) may contain a colorant such as pigment or dye. Preferably, the colorant is so added to the starting resin that its amount falls between 0.01 and 10 parts by weight, more preferably between 0.5 and 5 parts by weight, relative to 100 parts by weight of the resin. If desired, any ordinary additives such as stabilizer, antistatic agent, weatherproofing agent, flame retardant, dispersant and nucleating agent may be added to the starting resin, depending on the applications and the necessary characteristics of the blow moldings to be produced.

The method for producing blow moldings of the invention is described below.

The method for producing blow moldings of the invention comprises preparing a crystalline resin melt parison in the space of a blow mold, clamping the mold, and introducing a pressure fluid into the parison to blow and tightly press the parison against the inner wall of the mold, thereby solidifying the parison along the wall, and the method is characterized in that the temperature of the inner wall of the mold is so controlled that it falls between a temperature lower by 20° C. than the crystallization temperature (hereinafter referred to as Tc) of the crystalline resin and a temperature below the temperature lower by 5° C. than the melting point (hereinafter referred to as Tm) of the crystalline resin, while the parison is prepared in the mold, and that, after the mold has been clamped to pinch the parison therein, a pressure fluid is introduced into the thus-pinched parison, then the mold with the parison therein is so heated that the temperature of its inner wall falls between a temperature lower by 10° C. than the melting point of the crystalline resin and a temperature below the melting point of the crystalline resin, the parison is kept in the mold at the controlled temperature falling between a temperature lower by 10° C. than the melting point of the crystalline resin and a temperature below the melting point of the crystalline resin for a satisfactory period of time enough for the thus blow-molded article of the parison to have a surface hardness of not lower than the level of HB in terms of the pencil hardness measured in a pencil scratch test, and finally the mold is cooled and the blow-molded article is released from the mold.

One preferred embodiment of the method for producing blow moldings of the invention that comprises preparing a crystalline resin melt parison in the space of a blow mold, clamping the mold, and introducing a pressure fluid into the parison to blow and tightly press the parison against the inner wall of the mold, thereby solidifying the parison along the wall is such that the temperature of the inner wall of the mold is so controlled that it is lower by from 5 to 10° C. than the crystallization temperature of the crystalline resin, while the parison is prepared in the mold, and that, after the mold has been clamped to pinch the parison therein, a pressure fluid is introduced into the thus-pinched parison, then the mold with the parison therein is so heated that the temperature of its inner wall falls between a temperature lower by 10° C. than the melting point of the crystalline resin and a temperature below the melting point of the crystalline resin, the parison is kept in the mold at the controlled temperature falling between a temperature lower by 10° C. than the melting point of the crystalline resin and a temperature below the melting point of the crystalline resin for a satisfactory period of time enough for the thus blow-molded article of the parison to have a surface hardness of not lower than the level of HB in terms of the pencil hardness measured in a pencil scratch test, and finally the mold is cooled and the blow-molded article is released from the mold.

In the method of the invention for producing single-layered blow moldings, referred to are the crystallization temperature and the melting point of the crystalline resin to form the melt parison. On the other hand, in the method for producing multi-layered blow moldings, referred to are the crystallization temperature and the melting point of the crystalline resin to form the outermost layer of the melt parison. As so mentioned hereinabove, the starting resin for the blow moldings of the invention may contain colorant and other various additives. Accordingly, the crystallization temperature and the melting point of resin referred to in the production method of the invention may be those of crystalline resin containing colorant and various additives.

The method of the invention for producing blow moldings is described more concretely. Using an extrusion-molding machine, crystalline resin such as that mentioned above is melt-extruded to form a tubular melt parison, and the parison is hung in the space of an opened blow mold with its bottom end being pinched. Then, the parison is pre-blown in some degree. During or after the pre-blowing step, the blow mold is clamped, and the thus pre-blown parison is finally blown in the clamped mold. In this method, the temperature of the inner wall of the mold is so controlled that it falls between (Tc−20)° C. and (Tm−5)° C. but lower than (Tm−5)° C., preferably between (Tc−10) and (Tc−5)° C. while the parison is prepared in the mold, or that is, just before the parison is brought into contact with the inner wall of the mold. The reason for the temperature control on the inner wall of the mold is because, if the parison is brought into contact with the inner wall of the mold while the temperature of the inner wall of the mold is still lower than (Tc−20)° C., the blow-molded article from the parison will lose surface uniformity, and its surface will be too much roughened. As a result, the appearance of the blow-molded article will be poor. If, however, the parison is brought into contact with the inner wall of the mold while the temperature of the inner wall of the mold is kept higher than (Tm−5)° C., the surface hardness of the resulting blow-molded article could not be increased.

Next, the mold with the parison therein is clamped, and the parison is thus pinched in the mold, and then a pressure fluid is introduced into the parison. In this step, the mold with the parison therein is so heated that the temperature of its inner wall falls between (Tm−10)° C. and (below Tm), preferably between (Tm−10)° C. and (Tm−5)° C., and the parison is kept in the mold at the controlled temperature falling between (Tm−10)° C. and (below Tm), preferably between (Tm−10)° C. and (Tm−5)° C., for a satisfactory period of time enough for the thus blow-molded article of the parison to have a surface hardness of not lower than the level of HB in terms of the pencil hardness measured in a pencil scratch test. Finally, the mold is cooled to a temperature at which the blow-molded article produced therein can be taken out of it, then the mold is opened, and the article is taken out of it. The temperature control in this step is because, if the temperature of the inner wall of the mold is higher than a temperature below Tm after the parison has been pinched in the mold, the surface hardness of the resulting blow-molded article from the parison will be low; and if the temperature is lower than (Tm−10)° C., the surface hardness of the blow-molded article from the parison will be also low. In the latter stage of this blow-molding process, the period of time for which the parison in the mold is kept at the controlled temperature falling between (Tm−10)° C. and (below Tm) must be enough for the thus blow-molded article of the parison to have a surface hardness of not lower than the level of HB, preferably not lower than the level of F in terms of the pencil hardness measured in a pencil scratch test. The necessary period of time will vary in some degree, depending on the type of the crystalline resin used, the profile of the blow-molded article to be finally obtained, and the temperature of the inner wall of the mold used, but may be generally at least 10 seconds, preferably at least 20 seconds, more preferably at least 1 minutes, even more preferably 3 minutes or so. Even though the retention time is longer than 3 minutes, the surface hardness of the blow-molded article could not increase anymore, and such a long retention time is rather disadvantageous as prolonging the time of molding cycle.

For specifically controlling the temperature of the inner surface of the blow mold, employable is any ordinary method of heating molds. For example, the blow mold may be heated by circulating a heating medium, such as oil, steam or pressure water inside it or may be electrically heated in any mode of internal heating or external heating.

While being kept in contact with the inner wall of the mold, the crystalline resin parison receives the design of the inner wall that forms the cavity of the mold. With the inner wall design of the mold having been thus transferred onto its surface, the blown parison is cooled and solidified to be a blow-molded article. For this, the mold with the blown parison therein may be cooled; or a pressure coolant fluid may be introduced into the cavity of the blown parison in the mold to thereby directly cool the blown parison. Preferably, the pressure coolant fluid is one having a lowered temperature not higher than room temperature. Preferred for the pressure coolant fluid is compressed air having a temperature is not higher than −20° C., more preferably not higher than −30° C., and having a pressure that falls between 2 and 10 kg/cm$^2$G or so. For making the pressure coolant fluid run in the blown parison, a discharge tube for pressure fluid is inserted into the parison at the same time when the inlet tube for pressure fluid for expanding the parison is inserted thereinto, and the stopper of the discharge tube is opened just after the start of cooling the blown parison so that the pressure fluid having been contacted with the high-temperature blown parison and having been thus heated is discharged out of the parison through the discharge tube. In this case, it is desirable that the cooling rate is controlled by controlling the flow rate of the pressure fluid being discharged out of the blown parison through the discharge tube so that the pressure in the cavity of the blown parison is kept constant all the time while the parison is cooled.

The blow molding machine to be used for producing the blow moldings in the manner as herein may be any ordinary one. Preferably, the cavity surface of the blow mold to be used herein is polished to a degree of at least #800, more preferably at least #1000. Also preferably, the blow mold has vent holes. More preferably, the vent holes are provided through the part of the mold around which some gas will remain between the parison and the mold, for example, through the part of the mold concaved to a great extent to form a deep hollow in the mold cavity. In that part of the mold, the blown parison will often fail to accurately receive the mold design (mold design transfer failure), and it is desirable to provide vent holes through the part of mold. In the mold with such vent holes, blow moldings, even though having a complicated shape, can be well formed, and their surface condition is good. The aperture of each vent hole may fall between 0.2 and 0.5 mm or so in diameter, but is preferably at most 100 $\mu$m, more preferably at most 80 $\mu$m for obtaining blow moldings of better appearance. The hole pitch (hole-to-hole distance) may be at most 100 mm, but preferably at most 50 mm, more preferably at most 30 mm.

In the manner described herein, crystalline resin is blow-molded in a mold while the temperature of the mold is specifically controlled to fall within a specific range. In the latter stage of the blow-molding operation, the blown parison is kept at a temperature falling within a specific range for a predetermined period of time. The blow-molded article thus produced has good surface characteristics of good surface gloss and good scratch resistance. Specifically its surface gloss is at least 80% measured at an incident angle of 60° according to JIS K7105, and its surface scratch resistance in terms of the pencil hardness measured in a pencil scratch test according to JIS K5400 is at least on the level of HB.

The invention is described more concretely with reference to the following Examples.

EXAMPLE 1

A nucleating agent, sodium 2,2-methylenebis(4,6-di-t-butylphenyl)phosphate (Asahi Denka's NA11) was added to a starting resin, homopolypropylene having an melt index (at 230° C. under a load of 2.16 kg) of 0.6 g/10 min (Idemitsu Petrochemical's, Idemitsu Polypro E-105GM) to prepare a resin composition in which the concentration of the nucleating agent was 1000 ppm.

The starting resin (homopolypropylene resin composition) was fed into an extruder, and melted and kneaded therein. At a resin temperature of 230° C., this was formed into a melt parison. The melt parison was hung in the center of a blow mold, and pinched at its bottom end, and the parison was pre-blown in that condition. Next, the pre-blown parison was pinched in the blow mold, then the mold was clamped, and compressed air having a pressure of 6 kg/cm$^2$G was led into the parison, whereby the parison was thus blown.

During the step of blow-molding operation, the temperature of the blow mold was controlled as follows: After the parison was prepared in the blow mold but before it was contacted with the inner wall of the mold, the temperature of the inner wall of the mold was controlled at 120° C.; then, after the parison was pinched in the mold, the temperature was elevated up to 160° C.; and thereafter the elevated temperature of 160° C. was kept as such for 3 minutes, for which the blown parison was conditioned at the temperature; then the mold was cooled to 80° C., and opened, and the blow-molded article was taken out of the mold. In this Example 1, the temperature, 120° C. of the inner surface of the mold in which the parison was prepared is lower by 5° C. than the crystallization temperature of the starting resin (homopolypropylene resin composition); and the temperature, 160° C. of the inner surface of the mold in which the parison was pinched is lower by 5° C. than the melting point of the starting resin.

The cavity surface of the blow mold used herein was mirror-finished to have a degree of surface smoothness of 0.2 s; and the mold was provided with vent holes of 100 µm in diameter at a hole pitch of 10 mm.

The surface gloss of the blow-molded article was measured according to JIS K7105, for which was used a surface gloss meter (Nippon Denshoku Kogyo's UGS Sensor). Briefly, 6 test pieces of 50 mm×50 mm in size of the article were measured at 5 sites each, and the data were averaged. Regarding the condition for the measurement, the incident angle between the light-receiving surface of the test piece and the direction of the light thereto from a light source was 60°, and the light was reflected on the surface of the test piece in the direction just opposite to the incident ray direction. In that condition, the 60-degree mirror surface gloss of each test piece was measured.

The surface scratch resistance of the blow-molded article was measured in a pencil test according to JIS K5400, for which was used a pencil scratch tester for coating films (from Yasuda Seiki Seisakusho). In the test, used were laboratory pencils approved by the Coating Film Test Association of Japan. Briefly, 6 test pieces of 70 mm×70 mm×4.5 mm in size were tested to measure their pencil hardness. The minimum value of the data (this is the concentration code of the softest pencil of all tested) indicates the surface scratch resistance of the blow-molded article produced herein. The test results are given in Table 1.

The appearance and the visual gloss of the blow-molded article produced herein were also checked. The results are given in Table 1.

The appearance of the article was evaluated as follows:
(1) Samples free from wrinkles, streaks and fish eyes that may detract from their appearance are good (◯). Die lines, if any, are negligible in these samples; and the samples have a uniform surface gloss.
(2) Samples having some wrinkles, streaks and fish eyes that may detract from their appearance are not so good (Δ). Die lines are negligible in these samples, but the surface gloss of the samples is not uniform.
(3) Samples having noticeable wrinkles, streaks and fish eyes that significantly detract from their appearance are bad (x). Die lines are remarkable in these samples, and the surface gloss of the samples is not uniform.

The visual gloss of the article was evaluated as follows:
(1) Samples entirely having a uniform surface gloss, when checked in visual observation, are good (◯).
(2) Samples partly having a surface gloss, when checked in visual observation, are average (Δ). In these samples, a surface gloss is partly seen.
(3) Samples having no surface gloss, when checked in visual observation, are bad (x).

EXAMPLE 2

The same homopolypropylene resin composition as in Example 1 was used as the starting resin for the outer layer of a two-layered structure. For the base layer of the structure, used was a propylene-block copolymer composition. This was prepared by melting and kneading 75% by weight of a propylene block copolymer (Idemitsu Petrochemical's Idemitsu Polypro E-185G) composed of a polypropylene component and a polyethylene component and having a melt index (at 230° C. under a load of 2.16 kg) of 0.1 g/10 min; 5% by weight of high-density polyethylene (Idemitsu Petrochemical's Idemitsu Polyethylene 750LB) having a melt index (at 190° C. under a load of 2.16 kg) of 0.03 g/10 min; and 20% by weight of an inorganic filler, talc (having a mean particle size of 1.5 µm and a mean aspect ratio of 15). These starting resins for the outer layer and the base layer were separately melted and kneaded in different extruders, and passed through a cross-head die to form a two-layered melt parison.

The two-layered melt parison was blown and molded in the same manner as in Example 1 into a blow-molded article. For the temperature control of the blow mold for this, however, the blown parison was kept heated at the controlled temperature of 160° C. for 0.5 minutes. The thus blow-molded article had a two-layered structure. The two-layered wall in the center part of this article was comprised of the base layer having a thickness of 4 mm and a surface layer having a thickness of 500 µm.

The blow-molded article was tested in the same manner as in Example 1 for its surface gloss, surface scratch resistance, appearance and visual gloss. The test results are given in Table 1.

EXAMPLE 3

A two-layered blow-molded article was produced in the same manner as in Example 2, for which, however, the temperature of the blow mold was so controlled that the blown parison in the mold was kept heated at the controlled temperature of 160° C. for 1 minute.

The blow-molded article was tested in the same manner as in Example 1 for its surface gloss, surface scratch resistance, appearance and visual gloss. The test results are given in Table 1.

EXAMPLE 4

A two-layered blow-molded article was produced in the same manner as in Example 2, for which, however, the temperature of the blow mold was so controlled that the blown parison in the mold was kept heated at the controlled temperature of 160° C. for 3 minutes.

The blow-molded article was tested in the same manner as in Example 1 for its surface gloss, surface scratch resistance, appearance and visual gloss. The test results are given in Table 1.

COMPARATIVE EXAMPLE 1

A two-layered blow-molded article was produced in the same manner as in Example 2. For this, however, the temperature control of the blow mold was as follows: The parison having been prepared in the mold was kept at 72° C. before it was contacted with the inner wall of the mold; then, the parison was pinched in the mold, and thereafter heated up to 165° C.; and the thus-heated parison was kept heated still at 165° C. for 5 seconds.

The blow-molded article was tested in the same manner as in Example 1 for its surface gloss, surface scratch resistance, appearance and visual gloss. The test results are given in Table 1.

COMPARATIVE EXAMPLE 2

A two-layered blow-molded article was produced in the same manner as in Example 2. For this, however, the temperature control of the blow mold was as follows: The parison having been prepared in the mold was kept at 76° C. before it was contacted with the inner wall of the mold; then, the parison was pinched in the mold, and thereafter heated up to 162° C.; and the thus-heated parison was kept heated still at 162° C. for 5 seconds.

The blow-molded article was tested in the same manner as in Example 1 for its surface gloss, surface scratch resistance, appearance and visual gloss. The test results are given in Table 1.

COMPARATIVE EXAMPLE 3

A two-layered blow-molded article was produced in the same manner as in Example 2. For this, however, the temperature control of the blow mold was as follows: The parison having been prepared in the mold was kept at 120° C. before it was contacted with the inner wall of the mold; then, the parison was pinched in the mold, and thereafter cooled to 80° C.; and the blow-molded article was taken out of the mold.

The blow-molded article was tested in the same manner as in Example 1 for its surface gloss, surface scratch resistance, appearance and visual gloss. The test results are given in Table 1.

COMPARATIVE EXAMPLE 4

A two-layered blow-molded article was produced in the same manner as in Example 2. For this, however, the temperature control of the blow mold was as follows: The parison having been prepared in the mold was kept at 120° C. before it was contacted with the inner wall of the mold; then, the parison was pinched in the mold still at 120° C.; and dry air at −35° C. was introduced into the cavity of the blown parison so as to rapidly cool the parison, while the heated air was discharged out of the parison.

The blow-molded article was tested in the same manner as in Example 1 for its surface gloss, surface scratch resistance, appearance and visual gloss. The test results are given in Table 1.

COMPARATIVE EXAMPLE 5

A single-layered blow-molded article was produced in the same manner as in Example 1. For this, however, the temperature control of the blow mold was as follows: The parison having been prepared in the mold was kept at 50° C. before it was contacted with the inner wall of the mold; and the parison was then blown into a blow-molded article still at the controlled temperature of 50° C.

The blow-molded article was tested in the same manner as in Example 1 for its surface gloss, surface scratch resistance, appearance and visual gloss. The test results are given in Table 1.

COMPARATIVE EXAMPLE 6

A two-layered blow-molded article was produced in the same manner as in Example 2. For this, however, the temperature control of the blow mold was as follows: The parison having been prepared in the mold was kept at 50° C. before it was contacted with the inner wall of the mold; and the parison was then blown into a blow-molded article still at the controlled temperature of 50° C.

The blow-molded article was tested in the same manner as in Example 1 for its surface gloss, surface scratch resistance, appearance and visual gloss. The test results are given in Table 1.

TABLE 1

| | Molding Condition | | Blow-Molded Article | | | |
|---|---|---|---|---|---|---|
| | Inner Surface Temperature of Blow Mold (° C.) | Retention Time (min) | Surface Gloss (%) | Pencil Hardness | Appearance | Visual Gloss |
| Example 1 | 120 → 160 → 80 | 3 | 89 | F | ◯ | ◯ |
| Example 2 | 120 → 160 → 80 | 0.5 | 87 | HB | ◯ | ◯ |
| Example 3 | 120 → 160 → 80 | 1 | 89 | F | ◯ | ◯ |
| Example 4 | 120 → 160 → 80 | 3 | 89 | F | ◯ | ◯ |

TABLE 1-continued

| | Molding Condition | | Blow-Molded Article | | | |
|---|---|---|---|---|---|---|
| | Inner Surface | | | | | |
| | Temperature of Blow Mold (° C.) | Retention Time (min) | Surface Gloss (%) | Pencil Hardness | Appearance | Visual Gloss |
| Co. Ex. 1 | 72 → 165 → 80 | (5 sec) | 67 | 2B | Δ | x |
| Co. Ex. 2 | 76 → 162 → 80 | (5 sec) | 65 | 2B | Δ | x |
| Co. Ex. 3 | 120 → 80 | — | 88 | B | ○ | ○ |
| Co. Ex. 4 | 120 → 120* | — | 88 | B | ○ | ○ |
| Co. Ex. 5 | 50 | — | 65 | 2B | x | x |
| Co. Ex. 6 | 50 | — | 65 | 2B | x | x |

*The cavity of the blown parison was cooled.

Industrial Applicability

As having good surface gloss and high surface hardness enough for scratch resistance, the blow moldings of the invention are widely used in various fields of automobile parts and housing facilities that are required to have such properties. Such blow moldings having the characteristics as above are efficiently produced according to the method of the invention which requires a simple operation only for specifically controlling the temperature profile of the inner surface of the blow mold used therein.

What is claimed is:

1. A method for producing blow moldings, which comprises preparing a crystalline resin melt parison in the space of a blow mold, clamping the mold, and introducing a pressure fluid into the parison to blow and tightly press the parison against the inner wall of the mold, thereby solidifying the parison along the wall; the method being characterized in that the temperature of the inner wall of the mold is so controlled that it falls between a temperature lower by 20° C. than the crystallization temperature of the crystalline resin and a temperature below the temperature lower by 5° C. than the melting point of the crystalline resin, while the parison is prepared in the mold, and that, after the mold has been clamped to pinch the parison therein, a pressure fluid is introduced into the thus-pinched parison, then the mold with the parison therein is so heated that the temperature of its inner wall falls between a temperature lower by 10° C. than the melting point of the crystalline resin and a temperature below the melting point of the crystalline resin, the parison is kept in the mold at the controlled temperature falling between a temperature lower by 10° C. than the melting point of the crystalline resin and a temperature below the melting point of the crystalline resin for a satisfactory period of time enough for the thus blow-molded article of the parison to have a surface hardness of not lower than the level of HB in terms of the pencil hardness measured in a pencil scratch test, and finally the mold is cooled and the blow-molded article is released from the mold.

2. The method for producing blow moldings as claimed in claim 1, in which the mold is clamped to pinch the parison therein, a pressure fluid is introduced into the thus-pinched parison, then the mold with the parison therein is so heated that the temperature of its inner wall is lower by from 5 to 10° C. than the melting point of the crystalline resin that forms the parison, and the parison is kept in the mold at the controlled temperature lower by from 5 to 10° C. than the melting point of the crystalline resin for a satisfactory period of time enough for the thus blow-molded article to have a surface hardness of not lower than the level of HB in terms of the pencil hardness measured in a pencil scratch test.

3. The method for producing blow moldings as claimed claim 1, wherein the period of time enough for the blow-molded article to have a surface hardness of not lower than the level of HB in terms of the pencil hardness measured in a pencil scratch test is at least 10 seconds.

4. The method for producing blow moldings as claimed in claim 3, wherein the period of time enough for the blow-molded article to have a surface hardness of not lower than the level of HB in terms of the pencil hardness measured in a pencil scratch test is at least 20 seconds.

5. A method for producing blow molding, which comprises preparing a crystalline resin melt parison in the space of a blow mold, clamping the mold, and introducing a pressure fluid into the parJ.son to blow and tightly press the parison against the inner wall of the mold, thereby solidifying the parison along the wall; the method being characterized in that the temperature of the inner wall of the mold is so controlled that it is lower by from 5 to 10° C. than the crystallization temperature of the crystalline resin, while the parison is prepared in the mold, and that, after the mold has been clamped to pinch the parison therein, a pressure fluid is introduced into the thus-pinched parison, then the mold with the parison therein is so heated that the temperature of its inner wall falls between a temperature lower by 10° C. than the melting point of the crystalline resin and a temperature below the melting point of the crystalline resin, the parison is kept in the mold at the controlled temperature falling between a temperature lower by 10° C. than the melting point of the crystalline resin and a temperature below the melting point of the crystalline resin for a satisfactory period of time enough for the thus blow-molded article of the parison to have a surface hardness of not lower than the level of HB in terms of the pencil hardness measured in a pencil scratch test, and finally the mold is cooled and the blow-molded article is released from the mold.

6. A method for producing multi-layered blow moldings of at least two layers with an outermost layer of crystalline resin, which comprises preparing a melt parison in the space of a blow mold, clamping the mold, and introducing a pressure fluid into the parison to blow and tightly press the parison against the inner wall at the mold, thereby solidifying the parison along the wall; the method being characterized in that the temperature of the inner wall of the mold is so controlled that it falls between a temperature lower by 20° C. than the crystallization temperature of the crystalline resin and a temperature below the temperature lower by 50° C. than the melting point of the crystalline resin, while the parison is prepared in the mold, and that, after the mold has been clamped to pinch the parison therein, a pressure fluid is introduced into the thus-pinched parison, then the mold with the parison therein is so heated that the temperature of its inner wall falls between a temperature lower by 10° C. than the melting point of the crystalline resin and a temperature below the melting point of the crystalline resin, the parison is kept in the mold at the controlled temperature falling between a temperature lower by 10° C. than the melting point of the crystalline resin and a temperature below the melting point of the crystalline resin for a satisfactory period of time enough for the thus blow-molded article of the parison to have a surface hardness of not lower than the level of HB in terms of the pencil hardness assured in a pencil scratch test, and finally the mold is cooled and the blow-molded article is released from the mold.

7. The method for producing blow moldings as claimed in claim 6, in which the mold is clamped to pinch the parison therein, a pressure fluid is introduced into the thus-pinched parison, then the mold with the parison therein is so heated that the temperature of its inner wall is lower by from 5 to 10° C. than the melting point of the crystalline resin that forms the outermost layer of the parison, and the parison is kept in the mold at the controlled temperature lower by from 5 to 10° C. than the melting point of the crystalline resin for a satisfactory period of time enough for the thus blow-molded article to have a surface hardness of not lower than the level of HB in terms of the pencil hardness measured in a pencil scratch test.

8. A method for producing multi-layered blow moldings of at least two layers with an outermost layer of crystalline resin, which comprises preparing a melt parison in the space of a blow mold, clamping the mold, and introducing a pressure fluid into the parison to blow and tightly press the parison against the inner wall of the mold, thereby solidifying the parison along the wall; the method being characterized in that the temperature of the inner wall of the mold is so controlled that it is lower by from 5 to 10° C. than the crystallization temperature of the crystalline resin, while the parison is prepared in the mold, and that, after the mold has been clamped to pinch the parison therein, a pressure fluid is introduced into the thus-pinched parison, then the mold with the parison therein is so heated that the temperature of its inner wall falls between a temperature lower by 10° C. than the melting point of the crystalline resin and a temperature below the melting point of the crystalline resin, the parison is kept in the mold at the controlled temperature falling between a temperature lower by 10° C. than the melting point of the crystalline resin and a temperature below the melting point of the crystalline resin for a satisfactory period of time enough for the thus blow-molded article of the parison to have a surface hardness of not lower than the level of HB in terms of the pencil hardness measured in a pencil scratch test, and finally the mold is cooled and the blow-molded article is released from the mold.

* * * * *